US008738687B2

(12) United States Patent
Nakajima

(10) Patent No.: US 8,738,687 B2
(45) Date of Patent: May 27, 2014

(54) COMMUNICATION SYSTEM HAVING MANAGEMENT APPARATUS AND USER APPARATUS, MANAGEMENT APPARATUS, USER APPARATUS, AND METHOD OF CONTROLLING THE SAME

(75) Inventor: Takafumi Nakajima, Mitaka (JP)

(73) Assignee: Canon Kabushiki Kaisha, Tokyo (JP)

( * ) Notice: Subject to any disclaimer, the term of this patent is extended or adjusted under 35 U.S.C. 154(b) by 467 days.

(21) Appl. No.: 12/841,775

(22) Filed: Jul. 22, 2010

(65) Prior Publication Data

US 2011/0040862 A1 Feb. 17, 2011

(30) Foreign Application Priority Data

Aug. 11, 2009 (JP) ................................. 2009-186778

(51) Int. Cl.
*G06F 15/16* (2006.01)
(52) U.S. Cl.
USPC ........................................... 709/203; 709/223
(58) Field of Classification Search
USPC ........................... 709/203, 212, 217, 219, 223
See application file for complete search history.

(56) References Cited

U.S. PATENT DOCUMENTS

| 6,990,472 | B2 * | 1/2006 | Rosenhaft et al. ................ 705/77 |
| 7,117,519 | B1 * | 10/2006 | Anderson et al. ............. 725/105 |
| 7,222,363 | B2 * | 5/2007 | Rice et al. ........................... 726/5 |
| 7,551,013 | B2 * | 6/2009 | Kim et al. ...................... 327/231 |
| 7,551,913 | B1 * | 6/2009 | Chien ............................ 455/411 |
| 7,865,447 | B2 * | 1/2011 | Rosenhaft et al. .............. 705/64 |
| 7,984,487 | B2 | 7/2011 | Katsube et al. |
| 8,073,784 | B2 * | 12/2011 | Rosenhaft et al. .............. 705/64 |
| 8,086,276 | B1 * | 12/2011 | Fujisaki ........................ 455/566 |
| 8,090,402 | B1 * | 1/2012 | Fujisaki ..................... 455/556.1 |
| 2002/0060736 | A1 * | 5/2002 | Wakao et al. ................. 348/207 |
| 2004/0117660 | A1 * | 6/2004 | Karaoguz et al. ............. 713/201 |
| 2004/0252203 | A1 * | 12/2004 | Kitajima .................... 348/222.1 |
| 2005/0213147 | A1 * | 9/2005 | Minatogawa ................ 358/1.15 |

(Continued)

FOREIGN PATENT DOCUMENTS

| CN | 101365108 | 2/2009 |
| JP | 2003-223418 | 8/2003 |
| JP | 2008-167269 | 7/2008 |
| WO | 03/079205 | 9/2003 |

OTHER PUBLICATIONS

Corcoran et al., "Wireless Transfer of Images From a Digital Camera to the Internet Via A GSM Mobile Phone", IEEE Transactions on Consumer Electronics, IEEE Service Center, New York, vol. 47, No. 3, Aug. 1, 2001, pp. 542-547, (XP002268535).

(Continued)

*Primary Examiner* — Sargon Nano
(74) *Attorney, Agent, or Firm* — Fitzpatrick, Cella, Harper & Scinto

(57) ABSTRACT

To facilitate account information setting, in a communication system including a management apparatus which manages account information to be used to use a service provided by a server apparatus, and a user apparatus which uses the service, the management apparatus selects, based on device classification information acquired from the user apparatus, account information to be provided to the user apparatus from one or more pieces of account information stored in a storage unit, and provides the account information to the user apparatus. The user apparatus sends the device classification information of the user apparatus to the management apparatus, receives, from the management apparatus, the account information selected based on the device classification information, and uses the service provided by the server apparatus.

11 Claims, 12 Drawing Sheets

(56) References Cited

U.S. PATENT DOCUMENTS

| | | | |
|---|---|---|---|
| 2006/0010078 A1* | 1/2006 | Rezvani et al. | 705/66 |
| 2006/0044407 A1* | 3/2006 | Barbeau | 348/211.3 |
| 2006/0264202 A1* | 11/2006 | Hagmeier et al. | 455/411 |
| 2007/0049258 A1* | 3/2007 | Thibeault | 455/414.1 |
| 2010/0066839 A1* | 3/2010 | Azuma et al. | 348/207.1 |
| 2010/0177894 A1 | 7/2010 | Yasuma et al. | |
| 2012/0044366 A1* | 2/2012 | Anderson | 348/207.1 |
| 2012/0115448 A1* | 5/2012 | Rosenhaft et al. | 455/414.1 |
| 2012/0254112 A1* | 10/2012 | Anderson et al. | 707/631 |

OTHER PUBLICATIONS

European Search Report and opinion dated Nov. 25, 2010 for European Application No. EP 10170075.

Japanese Office Action dated Apr. 12, 2013 issued during prosecution of related Japanese application No. 2009-186778.

Chinese Office Action dated Jan. 14, 2013 issued during prosecution of related Chinese application No. 201010250117.7 (whole English-language translation included).

* cited by examiner

FIG. 4

| USER ACCOUNT LIST | ACCOUNT A | ACCOUNT B | ACCOUNT C |
|---|---|---|---|
| 402 SERVICE NAME | IMAGE SERVICE | PHOTO SHARE | MOVIE SHARE |
| 403 SERVICE TYPE | Image-Share | Image-Share | Movie-Share |
| 404 USER ID | mobile@email.com | mobile@email.com | test_user |
| 405 PASSWORD | 012345 | 012345 | abc012 |
| 406 REGISTERED/ UNREGISTERED | REGISTERED | UNREGISTERED | REGISTERED |

COMMUNICATION SYSTEM HAVING MANAGEMENT APPARATUS AND USER APPARATUS, MANAGEMENT APPARATUS, USER APPARATUS, AND METHOD OF CONTROLLING THE SAME

BACKGROUND OF THE INVENTION

1. Field of the Invention

The present invention relates to a management apparatus for providing a parameter such as a user account to an external apparatus, and the invention also relates to the user apparatus.

2. Description of the Related Art

There has recently been a growth in opportunities of using a service on the world wide web by a communication apparatus. Some web services require authentication using the user account (for example, user ID and password) of a user in order to be used by the user. To use such a web service, a user account creation process and registration process are necessary. A user often uses the function of a web browser or the like to create and register a user account for a web service via the Internet. The user inputs, via a user interface (UI), a user account to be newly created so that the creation process is performed in the server of the web service and a form message or the like in HTML (Hypertext Markup Language). To make the created user account usable, the user accesses a URL (Uniform Resource Locator) for user account registration to register the user account.

It is difficult for a communication apparatus without the web browser function to create and register a user account. There has been proposed a technique of creating a user account in a communication apparatus and connecting it to a web service. For example, Japanese Patent Laid-Open No. 2008-167269 proposes a technique of dynamically generating a user account from part of information associated with a communication apparatus based on a user account generation rule.

In some web services, however, the web browser function is mandatory for the user account creation process. For example, some services require an image authentication code for creation. The image authentication code requests a person to read and input random numbers or characters displayed as an image so as to prevent automatic registration by a program or a robot. Use of the image authentication code makes it difficult for a communication apparatus without the web browser function to create a user account automatically.

In addition, services that designate a user's e-mail address as a user ID are increasing in number. That is, an e-mail address is necessary for user account creation in some cases. For the user account creation process of such a web service, an apparatus having a web browser function or e-mail sending/receiving function is necessary.

If a communication apparatus without the web browser function is to use a web service which needs a new user account, it is necessary to create the user account in another communication apparatus having the web browser function. Then, user account information identical to the created user account needs to be set and input in the communication apparatus without the web browser function again. The operation of setting and inputting the user account again is cumbersome, and decreases the convenience of the user.

SUMMARY OF THE INVENTION

It is desirable to provide a technique of allowing a user apparatus that has difficulties in setting user account information to set the user account information easily.

According to one aspect of the present invention, a communication system includes a management apparatus which manages account information related to a service provided by a server apparatus, and a user apparatus which uses the service, the management apparatus comprises: a storage unit configured to store account information; an acquisition unit configured to acquire, from the user apparatus, device classification information of the user apparatus; and a providing unit configured to select, based on the device classification information acquired from the user apparatus, account information to be provided to the user apparatus from the account information stored in the storage unit, and providing the selected account information to the user apparatus, and the user apparatus comprises: a sending unit configured to send the device classification information of the user apparatus to the management apparatus; a receiving unit configured to receive, from the management apparatus, the account information selected by the providing unit based on the device classification information sent by the sending unit; and a use unit configured to use the service provided by the server apparatus in relation to the account information received by the receiving unit.

According to another aspect of the present invention, a management apparatus which manages account information relating to a service provided by a server apparatus, comprises: a storage unit configured to store account information; an acquisition unit configured to acquire, from a user apparatus which uses the service, device classification information of the user apparatus; and a providing unit configured to select, based on the device classification information acquired from the user apparatus, account information to be provided to the user apparatus from the account information stored in the storage means, and providing the selected account information to the user apparatus.

According to still another aspect of the present invention, a user apparatus which communicates with a management apparatus which manages account information relating to a service provided by a server apparatus, the user apparatus comprises: a sending unit configured to send device classification information of the user apparatus to the management apparatus; a receiving unit configured to receive, from the management apparatus, account information selected based on the device classification information sent by the sending unit; and a use unit configured to use the service provided by the server apparatus using the account information received by the receiving unit.

According to yet another aspect of the present invention, a method of controlling a management apparatus which manages account information related to a service provided by a server apparatus, the method comprises the steps of: acquiring, from a user apparatus which uses the service, device classification information of the user apparatus; selecting, based on the device classification information acquired from the user apparatus, account information to be provided to the user apparatus from account information stored in a storage unit in the management apparatus; and providing the account information to the user apparatus.

According to still yet another aspect of the present invention, a method of controlling a user apparatus which communicates with a management apparatus which manages account information related to a service provided by a server apparatus, the method comprises the steps of: sending device classification information of the user apparatus to the management apparatus; receiving, from the management apparatus, account information selected based on the device classification information sent in the sending step; and using the service provided by the server apparatus on the basis of the account information received in the receiving step.

According to the present invention, it is possible to provide a technique of allowing a communication apparatus that has difficulties in setting user account information to easily set the user account information.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

FIG. 4 is a view showing an example of user account information;

DESCRIPTION OF THE EMBODIMENTS

First Embodiment

As a communication system according to the first embodiment of the present invention, a communication system including a wireless communication apparatus 101, management apparatus 102, and web service server 105 will be exemplified below.

<Apparatus Arrangement>

Figure 1:
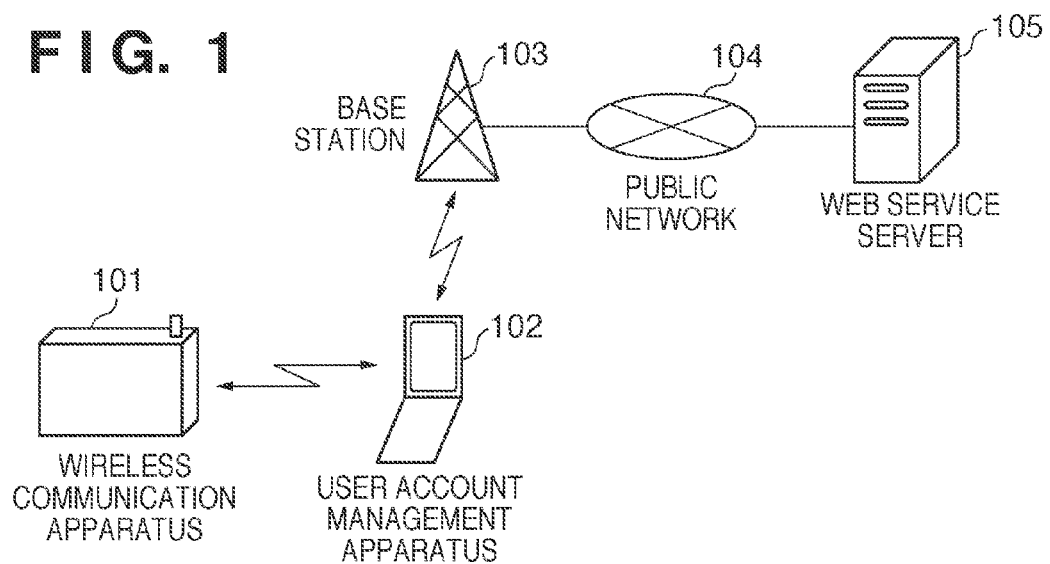
FIG. 1 is a view showing the overall arrangement of a communication system according to the first embodiment.

FIG. 1 is a view showing the overall arrangement of the communication system including the management apparatus 102 serving as a communication apparatus according to the first embodiment. The communication system includes the wireless communication apparatus 101 serving as a user apparatus, the management apparatus 102 serving as an account management apparatus, a base station 103, and the web service server 105. The base station 103 and the web service server 105 are connected to each other via a public network 104 that can be connected to the Internet.

The wireless communication apparatus 101 and the management apparatus 102 communicate by a first wireless communication method. On the other hand, the management apparatus 102 and the base station 103 communicate by a second wireless communication method. The first wireless communication method will be described as IEEE802.11 wireless LAN (local area network) below. However, the present invention is not limited to this, and Bluetooth® or the like may also be used. The second wireless communication method will be described as a mobile communication network such as WCDMA (Wideband Code Division Multiple Access). However, the present invention is not limited to this.

In the first embodiment, the wireless communication apparatus 101 has a communication function by wireless LAN. The management apparatus 102 has a communication function by wireless LAN and a communication function by the mobile communication network. Note that in the following explanation, the wireless communication apparatus 101 is assumed to be a camera, and the user account management apparatus 102 is assumed to be a cellular phone apparatus. However, the present invention is not limited to this.

Figure 2:
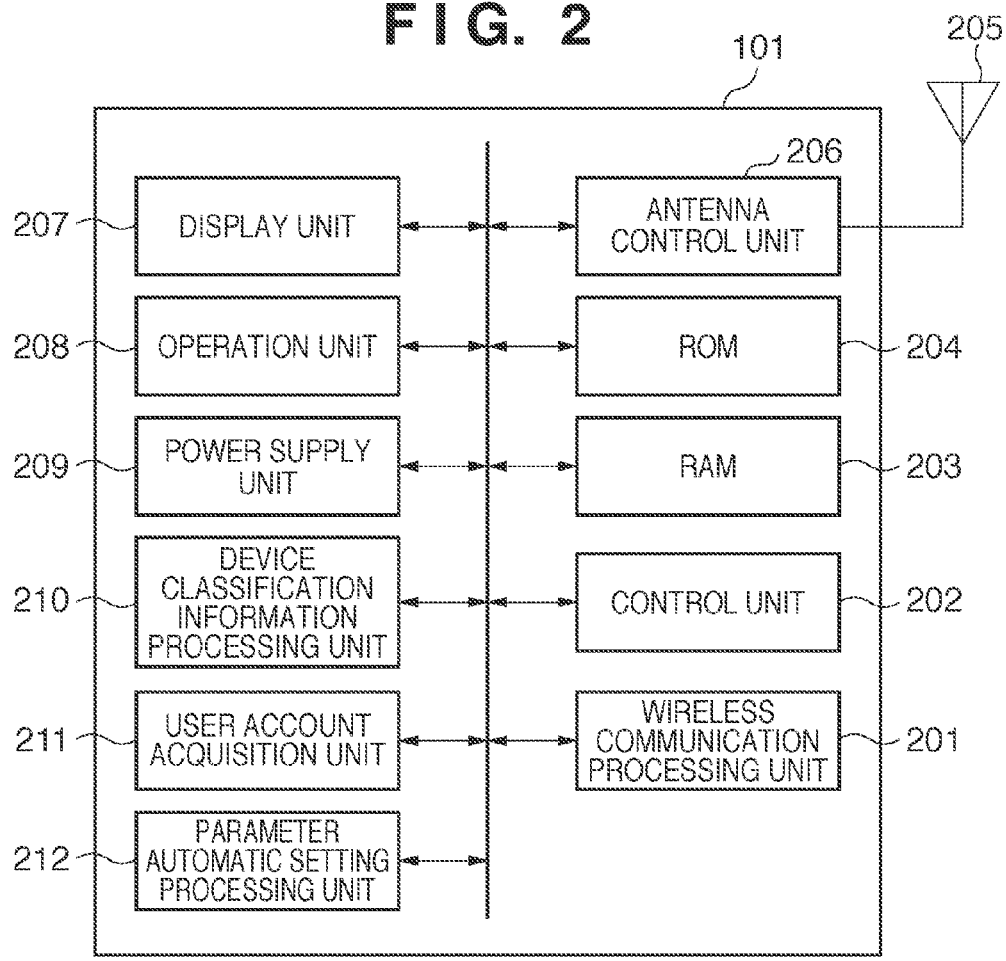
FIG. 2 is a block diagram showing the internal arrangement of a wireless communication apparatus (a "user apparatus")

FIG. 2 is a block diagram showing an example of the internal blocks of the wireless communication apparatus 101. A wireless communication processing unit 201 controls communication by wireless LAN. A control unit 202 includes, for example, a CPU and peripheral circuits, and controls the entire wireless communication apparatus 101. A RAM 203 is a volatile memory serving as a work memory or used to temporary store data when executing computer programs. A ROM 204 is a nonvolatile memory that stores control commands (i.e. computer programs).

An antenna 205 receives a radio signal transmitted from another wireless communication apparatus, or transmits a radio signal to another wireless communication apparatus. An antenna control unit 206 is a so-called RF (radio frequency) unit, and serves as a functional unit that demodulates and decodes a radio signal to reconstruct information, or encodes and modulates transmission data to generate a transmission signal. A display unit 207 formed from a liquid crystal display or the like is a functional unit that visually provides various kinds of information to the user. An operation unit 208 includes switches and buttons, and serves as a functional unit that receives user instructions. A power supply unit 209 supplies power to the units of the wireless communication apparatus 101.

A device classification information processing unit 210 is a functional unit that creates data associated with the device classification information of the wireless communication apparatus 101 itself. The device classification information processing unit 210 also identifies device classification information from received data that is sent from a partner communication apparatus and associated with its device classification information. The device classification information processing unit 210 may also be referred to as a sending means because it sends the device classification information. A user account acquisition unit 211 is a functional unit that generates various kinds of data to acquire a user account, and performs various kinds of processes using the acquired user account, such as receiving account information from an external source and using the service from the service provider 105 based on the account information of the user. A parameter automatic setting processing unit 212 is a functional unit that sets a parameter necessary for wireless communication with another communication apparatus.

Figure 3:
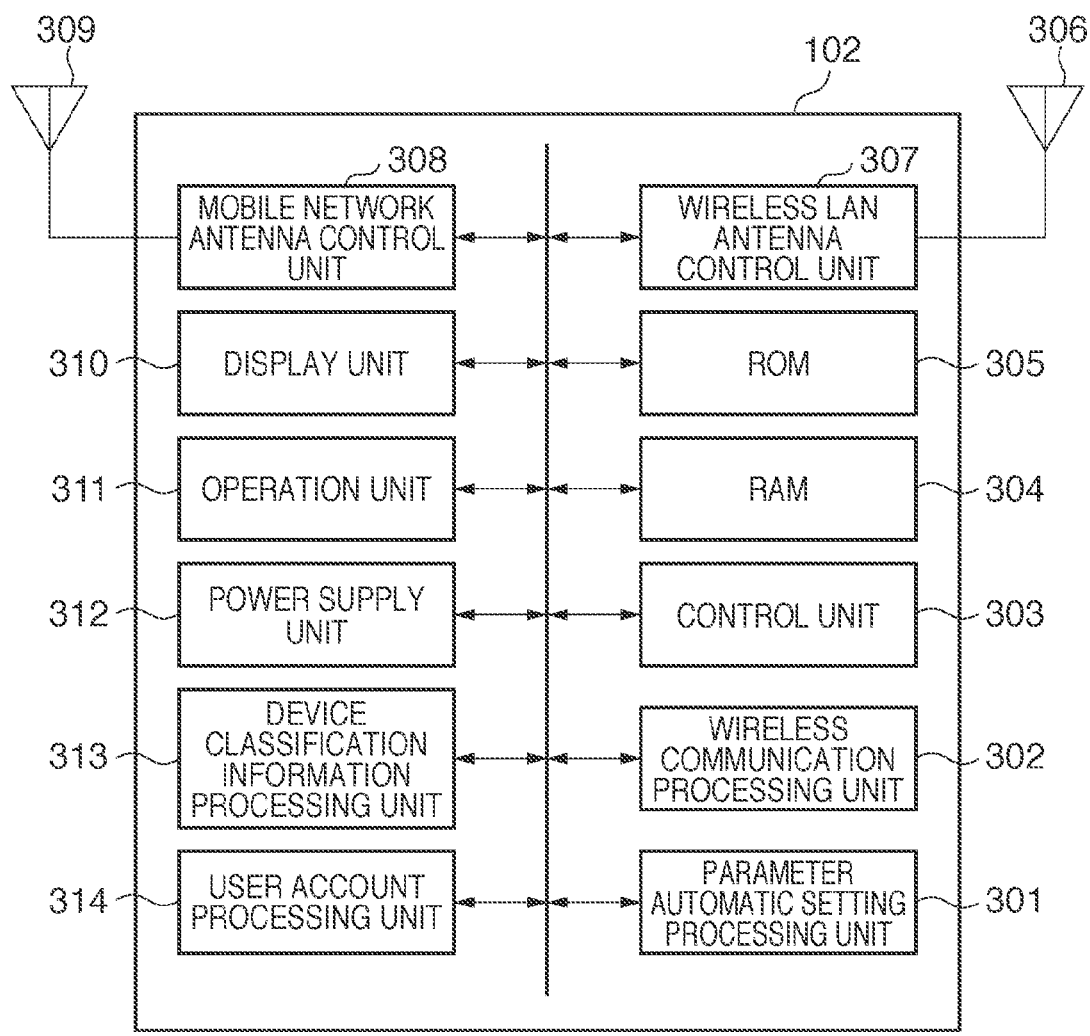
FIG. 3 is a block diagram showing the internal arrangement of a management apparatus.

FIG. 3 is a block diagram showing an example of the internal blocks of the management apparatus 102. A parameter automatic setting processing unit 301 is a functional unit that sets a parameter necessary for wireless communication with another communication apparatus. A wireless communication processing unit 302 controls communication by wireless LAN and communication by the mobile communication network. A control unit 303 includes, for example, a CPU and peripheral circuits, and controls the entire management apparatus 102. A RAM (Random Access Memory) 304 is a volatile memory (i.e. a storage unit) serving as a work memory or used to temporary store data when executing computer programs. A ROM (Read-only Memory) 305 is a nonvolatile memory that stores control commands. The ROM 305 also stores computer programs to implement the mail function and web browser function of a cellular phone.

A wireless LAN antenna 306 receives a radio signal transmitted from another wireless LAN apparatus, or transmits a radio signal to another wireless LAN apparatus. A wireless LAN antenna control unit 307 is a so-called RF unit, and serves as a functional unit that demodulates and decodes a wireless LAN signal to reconstruct information, or encodes and modulates transmission data to generate a transmission signal. A mobile network antenna 309 receives a radio signal transmitted from a base station, or transmits a radio signal to a base station. A mobile network antenna control unit 308 is a so-called RF unit, and serves as a functional unit that demodulates and decodes a signal in the mobile communication network to reconstruct information, or encodes and modulates transmission target data to generate a transmission signal. A display unit 310 formed from a liquid crystal display or the like is a functional unit that visually provides various kinds of information to the user. An operation unit 311 includes switches and buttons, and serves as a functional unit that receives user instructions. A power supply unit 312 supplies power to the units of the management apparatus 102.

A device classification information processing unit 313 is a functional unit that creates data associated with the device classification information of the management apparatus 102 itself. The device classification information processing unit 313 also identifies device classification information from received data that is sent from a partner communication apparatus and associated with its device classification information. Generally, the device classification information processing unit 313 may be regarded as an acquisition means because it acquires, from several different possible sources, device classification information. A user account processing unit 314 is a functional unit that receives a user account acquisition request from an external wireless communication apparatus, or generates and processes data to be used to access a web service server and register or create a user account.

FIG. 4 shows a user account list held by the management apparatus 102. The profiles (i.e. account information) of one or more users are listed and recorded in a user account list 401.

A service name 402 indicates the name of a web service that uses a user account. The service name can be either input by the user via the display unit 310 and the operation unit 311, or determined in advance. The service name can be set by the user or automatically set by a program.

A service type 403 indicates the service classification (service classification information) of a web service. Service types such as "Image-Share" for still image data sharing and "Movie-Share" for moving image data sharing indicate the contents of services. Note that the service type can be either input and designated by the user, or acquired by a program from information upon user account creation.

A user ID 404 indicates a user ID to be used for authentication of each web service. A password 405 indicates a password to be used for authentication of each web service. In the following description, a set of a user ID and a password is used as a user account. However, the present invention is not limited to this. For example, an access code or a PIN (Personal Identification Number) code may be included. Registered/unregistered information 406 indicates whether a user account is already registered in a specific web service. Each of accounts A, B, and C corresponds to one user account information set (i.e. each account has a separate profile).

Figure 5:
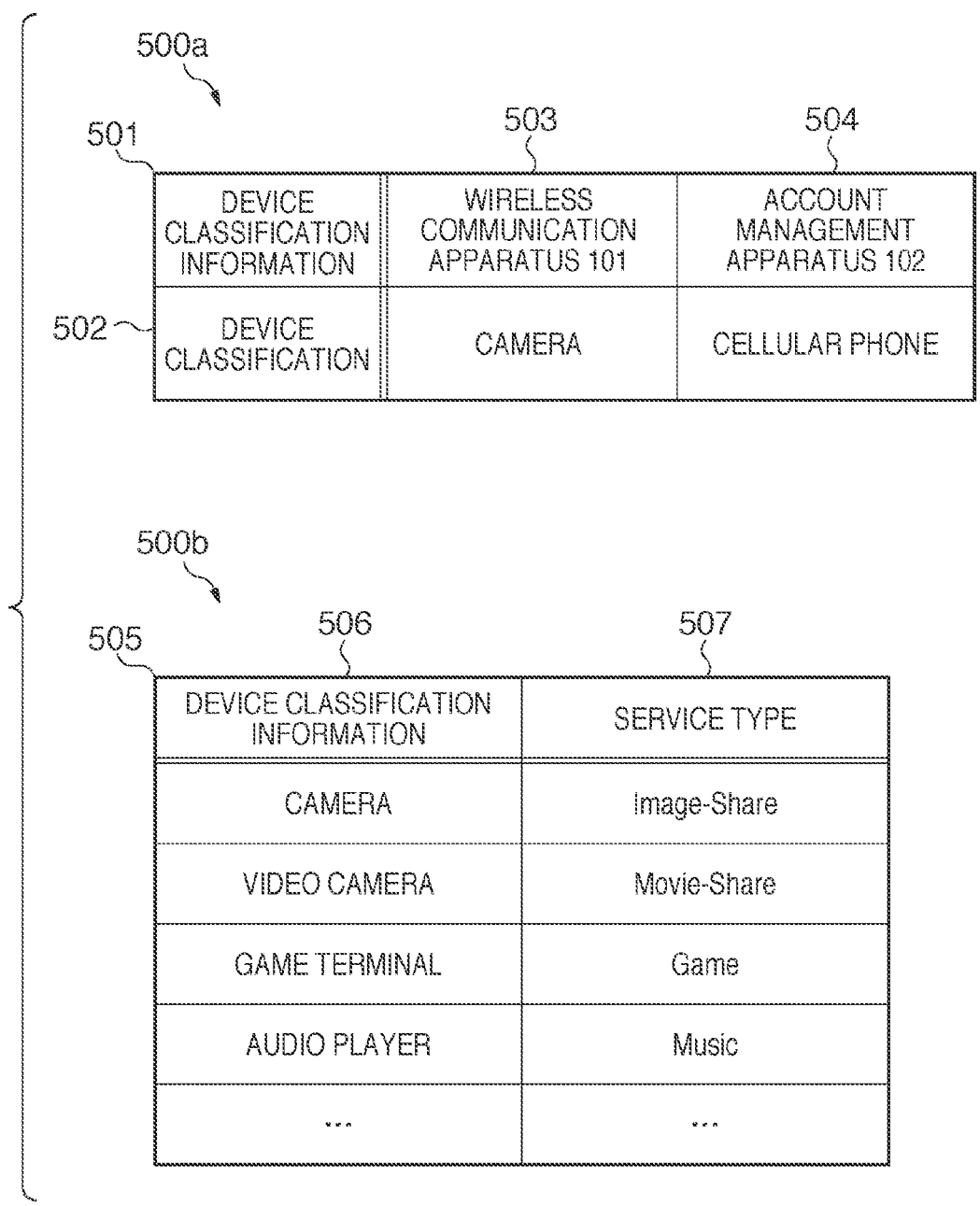
FIG. 5 is a view showing examples of a device classification information table and a correlation table of device classifications and service types.

Reference numeral 500a in FIG. 5 represents device classification information 501 that stores the device classifications 502 of the wireless communication apparatus 101 and the management apparatus 102. In this case, information representing that the wireless communication apparatus 101 is a "camera" 503 and the management apparatus 102 is a "cellular phone" 504 is stored. Note that the device classification information of devices themselves including the wireless communication apparatus 101 and the management apparatus 102 are preset in the ROM at the time of shipment from factories or the like.

Reference numeral 500b in FIG. 5 represents an example of a correlation table 505 that associates device classification information 506 and service types 507. More specifically, service types are set in correspondence with device functions so that "Image-Share" is set for a camera, and "Movie-Share" is set for a video camera. Note that the relationship between device classification information and service types is not limited to that shown in FIG. 5. For example, a device classification determined using the UPnP (Universal Plug and Play) protocol may be used.

<Outline of Operation of Each Device>

An example will be explained below in which the wireless communication apparatus 101 is connected to the management apparatus 102 by wireless LAN to upload an image to the web service server 105. Note that the wireless communication apparatus 101 and the management apparatus 102 are not yet connected by wireless LAN in the initial state. They are connected by creating a new wireless LAN network. The management apparatus 102 is communicable with the web service server 105 via the base station 103 and the public network 104. The management apparatus 102 can be connected to the wireless communication apparatus 101 by wireless LAN and simultaneously to the base station 103 via the public network. The management apparatus also functions as a gateway which transfers (i.e. relays) data from the wireless communication apparatus 101 to the web service server 105 via the public network 104.

Note that as described above, to use a service provided by the web service server 105, authentication using a user account is necessary. However, the wireless communication apparatus 101 does not store user account information necessary for using a web service. A user account setting for logging in of the wireless communication apparatus 101 to the web service server 105 will be described below.

Figure 6:
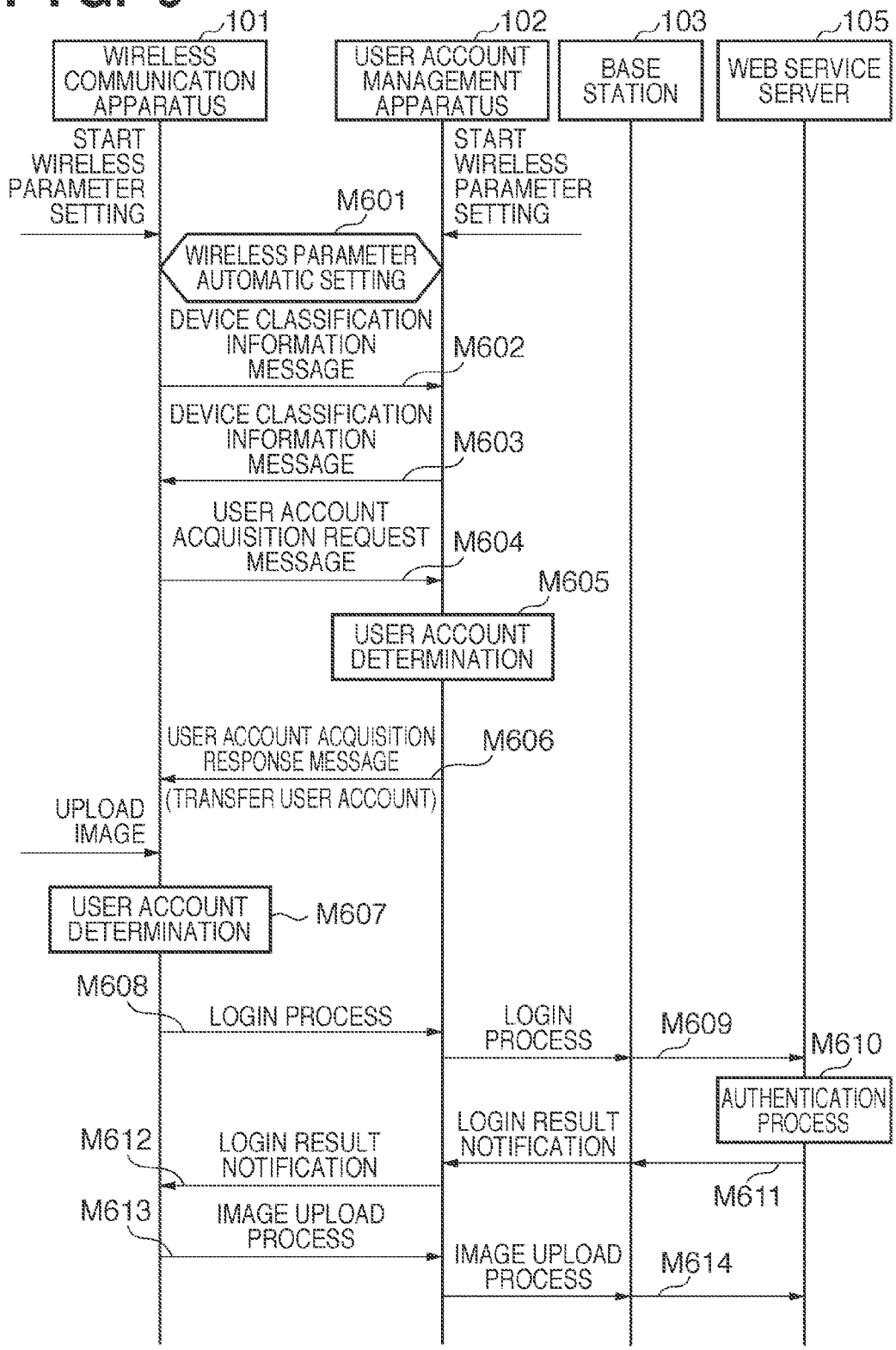
FIG. 6 is a sequence chart showing the operation of the communication system according to the first embodiment.

FIG. 6 is a sequence chart showing the operation of the communication system according to the first embodiment.

In M601, a wireless LAN parameter automatic setting process is performed between the wireless communication apparatus 101 and the management apparatus 102. Note that the parameter automatic setting processing units 212 and 301 start the setting process when, for example, each of the wireless communication apparatus 101 and the management apparatus 102 receives a parameter setting start instruction.

Note that the wireless parameter (communication parameter) automatic setting process can be done by WPS (WiFi (Wireless Fidelity) Protected Setup) or the like. In the wireless parameter automatic setting, parameter leakage to a third party is prevented by, for example, verifying, by a PIN code or the like, the authenticity of the apparatus that undergoes parameter setting. After the wireless parameter automatic setting has succeeded, a parameter common to the wireless communication apparatus 101 and the management apparatus 102 can be acquired. Connection by wireless LAN is done using the parameter.

In M602, the wireless communication apparatus 101 sends a device classification information message to the management apparatus 102. The device classification information message contains information representing the device classification (for example, camera) of the wireless communication apparatus 101. Information representing that the apparatus has no web browser function, or has difficulties in creating a user account may also be contained. In M603, the management apparatus 102 sends a device classification information message to the wireless communication apparatus 101. The device classification information message contains information indicating that the management apparatus 102 is, for example, a cellular phone apparatus. Information indicating that the apparatus has a web browser function, or is capable of creating a user account may also be contained. Information representing that the apparatus already has a user account may also be contained. This allows the wireless communication apparatus 101 to determine that the management apparatus 102 has a user account or is capable of creating one.

In M604, if the wireless communication apparatus 101 needs to acquire a user account, it sends a user account acquisition request message to the management apparatus 102. In M605, the management apparatus 102 performs user account determination, and sends a user account acquisition response message M606 to the wireless communication apparatus 101. The user account determination will be described later in detail. If there is a user account that may be provided to the wireless communication apparatus 101, the management apparatus sends a user account acquisition response message containing a corresponding user account.

Upon receiving an image upload instruction from the user, the wireless communication apparatus 101 starts an upload process.

In M607, the wireless communication apparatus 101 determines whether it has a user account necessary for authentication to the web service server. If the wireless communication apparatus 101 has a user account, it sends, to the management apparatus 102, a login process message including information for the web service server 105 in M608. In M609, the management apparatus 102 receives the login process message, and transfers it to the web service server 105.

In M610, the web service server 105 executes an authentication process using the user account included in the login process message. If the authentication has succeeded, the service of the web service server 105 becomes usable. In M611, the web service server 105 sends, to the management apparatus 102, a login result notification message including the authentication result and information for the wireless communication apparatus 101. In M612, the management apparatus 102 receives the login result notification message via the public network 104, and sends it to the wireless communication apparatus 101.

If the login has succeeded, the wireless communication apparatus 101 sends, to the management apparatus 102, an image upload process message containing an image to be uploaded to the web service server 105 in M613. In M614, the management apparatus 102 receives the image upload process message, and transfers it to the web service server 105. Image upload from the wireless communication apparatus 101 to the web service server 105 is thus implemented.

<Detailed Operation of Wireless Communication Apparatus 101>

Figure 7:
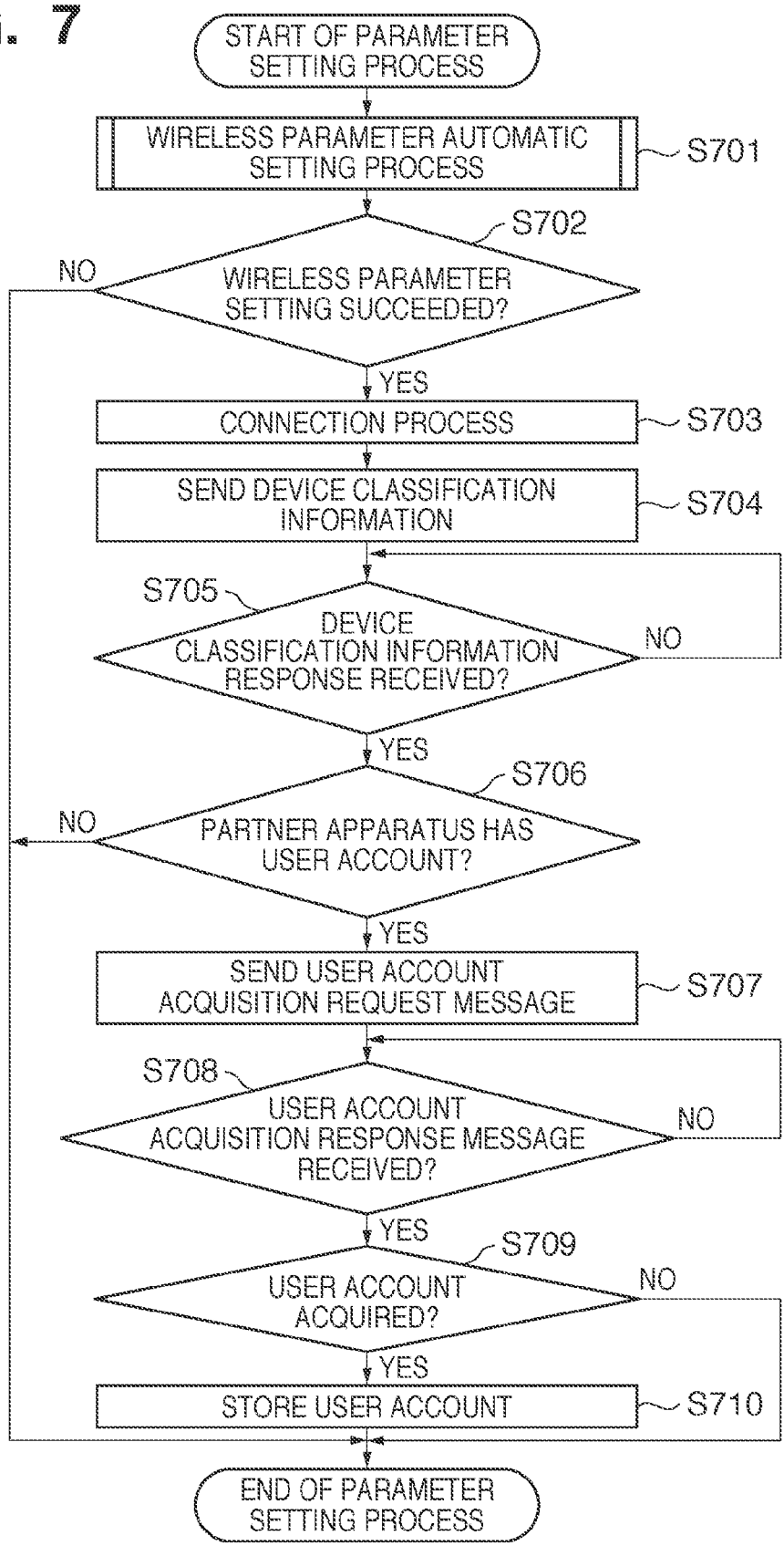
FIG. 7 is a flowchart illustrating the user account acquisition process of the wireless communication apparatus.

FIG. 7 is a flowchart of the user account acquisition process of the wireless communication apparatus 101. The steps to be explained below are implemented by causing the control unit 202 in the wireless communication apparatus 101 to execute a computer program stored in the ROM 204.

In step S701, upon receiving a wireless parameter setting process start instruction, the wireless communication apparatus 101 performs the wireless parameter automatic setting process. The parameter setting process start instruction is input by, for example, pressing the start button of the operation unit 208. Alternatively, the parameter setting process start instruction may be triggered by a program. The wireless parameter automatic setting process is performed by the parameter automatic setting processing unit 212.

After the wireless parameter automatic setting process has ended in step S701, the wireless communication apparatus determines in step S702 whether the wireless parameter setting has succeeded. If the setting has failed, the parameter setting process ends. If the setting has succeeded, the process advances to step S703.

In step S703, the wireless LAN connection process is performed using the parameter acquired by the wireless parameter automatic setting process in step S701. The wireless LAN connection process is done via the wireless communication processing unit 201.

When the connection process has ended, the wireless communication apparatus sends a device classification information message in step S704. After sending the device classification information message, the wireless communication apparatus waits for reception of a device classification information message from the partner apparatus in step S705. Note that the order of providing the device classification information of the self apparatus and acquiring the device classification information of the partner apparatus may be reversed.

After receiving the device classification information, the wireless communication apparatus determines in step S706 whether the partner communication apparatus has a user account. This determination is done based on, for example, whether the device classification information of the partner communication apparatus indicates that the partner communication apparatus is a PC or cellular phone having a web browser function. Upon determining that the partner communication apparatus has no user account, the parameter setting process ends. If the partner communication apparatus has a user account, the process advances to step S707.

In step S707, the wireless communication apparatus causes the user account acquisition unit 211 to send the user account acquisition request message. The user account acquisition request message may contain authentication information such as a password to indicate the authenticity of the acquisition apparatus. As the authentication information, for example, information exchanged with the partner communication apparatus during the parameter setting process or information shared in advance is used.

In step S708, the wireless communication apparatus waits for reception of the user account acquisition response message. Upon receiving the user account acquisition response message, the process advances to step S709.

In step S709, the wireless communication apparatus determines based on the contents of the user account acquisition response message whether the user account acquisition has succeeded. If the acquisition has failed, the parameter setting process ends. The acquisition response message includes, for example, information described in the user account list 401.

In the first embodiment, for example, since the device classification is "camera", "account A" and "account B" corresponding to service type "Image-Share" can be acquired from the comparison table in FIG. 5. If the acquisition has succeeded, the process advances to step S710.

In step S710, the acquired user accounts are stored. All the acquired user accounts may be stored, or only usable user accounts may be stored discriminately. The acquired user accounts are stored in the RAM 203 or the like.

Figure 8:
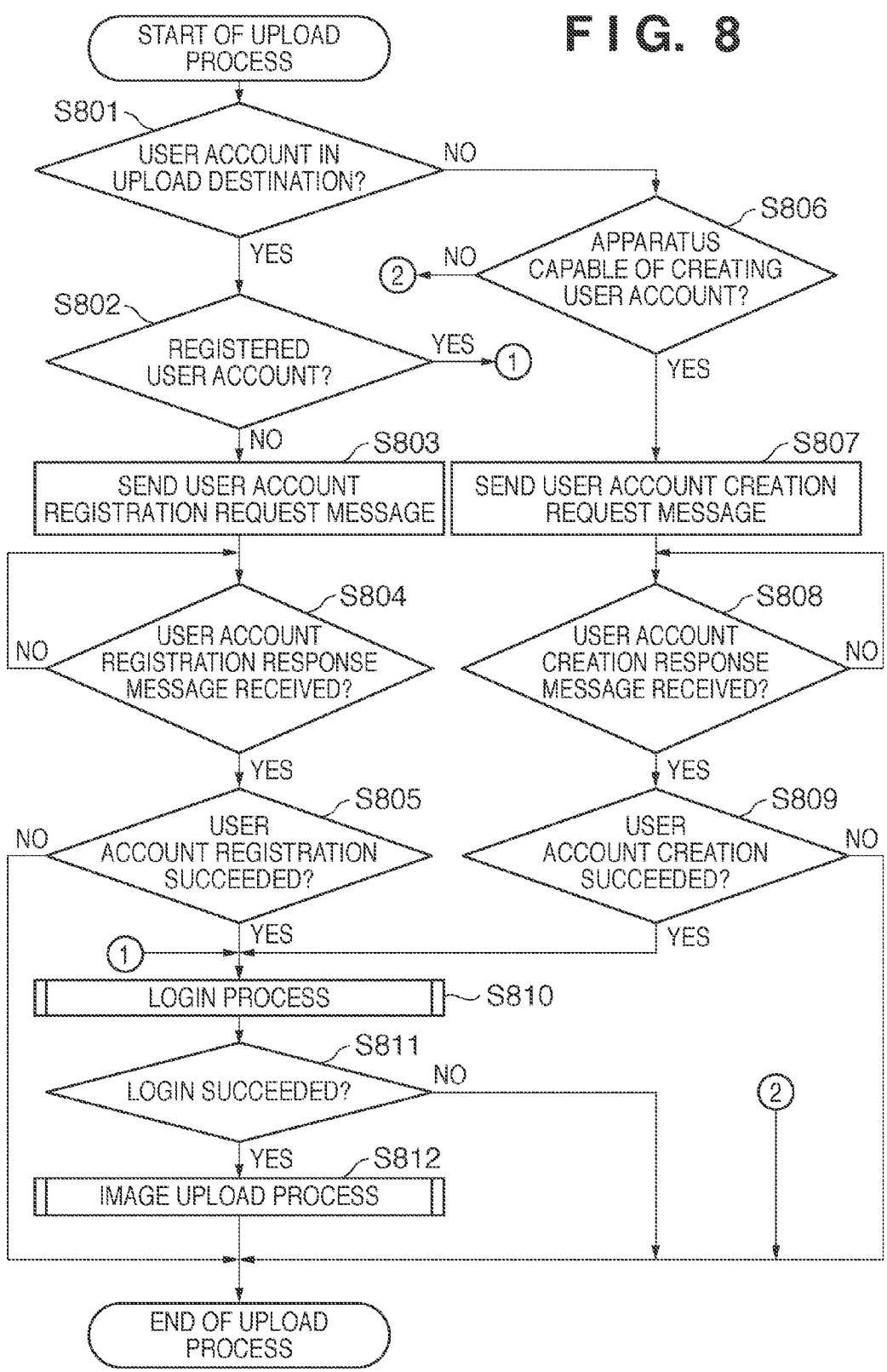
FIG. 8 is a flowchart illustrating the upload process of the wireless communication apparatus.

FIG. 8 is a flowchart of the upload process of the wireless communication apparatus 101. The wireless communication apparatus 101 starts the upload process upon receiving an upload instruction by an operation on the operation unit 208 or the like. Note that the steps to be explained below are implemented by causing the control unit 202 in the wireless communication apparatus 101 to execute a computer program stored in the ROM 204.

In step S801, the wireless communication apparatus determines whether it has the user account of the web service of the upload destination. If the apparatus has the user account of the web service of the upload destination, the process advances to step S802. If the apparatus has no user account, the process advances to step S806.

In step S802, the wireless communication apparatus determines whether the held user account is already registered. Whether the user account is already registered can be determined using, for example, the registered/unregistered information 406 in the user account list 401 as user account information. If the user account is already registered, the process advances to step S810. If the user account is found to be unregistered in step S802, the process advances to step S803. Note that if there are a plurality of pieces of account information provided by the management apparatus based on the service type of the web service to be used, specific account information may selectively be used.

In step S803, the wireless communication apparatus causes the user account acquisition unit 211 to send a user account registration request message. The apparatus sends the registration request message including the user account information to be registered. After sending the registration request message, the process advances to step S804.

In step S804, the wireless communication apparatus waits for reception of a user account registration response message. Upon receiving the user account registration response message, the process advances to step S805.

In step S805, the wireless communication apparatus determines based on the contents of the user account registration response message whether the user account registration has succeeded. If the user account registration has succeeded, the process advances to step S810. If the registration has failed, the upload process ends.

In step S806 (when no user account exists in the upload destination), the wireless communication apparatus determines whether a apparatus capable of creating a user account exists in the network. For example, the apparatus refers to a device classification information message or the like acquired during the parameter setting process, and determines based on the device classification information whether a apparatus capable of creating a user account exists. This determination is done based on, for example, whether the device classification information of the partner communication apparatus indicates that the apparatus is a PC (Personal computer) or cellular phone having a web browser function. If the partner communication apparatus has a web browser function, the communication apparatus is determined to be able to create a user account. A communication apparatus having no web browser function is determined to be unable to create a user account. Note that the determination need not always be done based on the presence/absence of the web browser function. The determination may be done based on another function. Alternatively, the device classification information message may include information representing whether user account creation is possible. Upon determining that an apparatus capable of creating a user account exists, the process advances to step S807. Upon determining that no such apparatus exists, the upload process ends.

In step S807, the wireless communication apparatus causes the user account acquisition unit 211 to create a user account creation request message, and send it to the apparatus capable of creating a user account. After the sending, the process advances to step S808.

In step S808, the wireless communication apparatus waits for reception of a user account creation response message. Upon receiving the user account creation response message, the process advances to step S809.

In step S809, the wireless communication apparatus determines based on the contents of the received user account creation response message whether the user account creation has succeeded. If the creation has succeeded, the process advances to step S810. If the creation has failed, the upload process ends.

In step S810, the wireless communication apparatus performs a login process to the web service using the corresponding user account. Note that the program for the login process may be stored in the ROM 204 in advance or acquired from the outside. When the login process has ended, the process advances to step S811.

In step S811, the wireless communication apparatus determines whether the login has succeeded. If the login has succeeded, the process advances to step S812. If the login has failed, the upload process ends.

In step S812, the image upload process is executed using the image to be uploaded. The protocol necessary for the image upload process can be either stored in the ROM 204 in advance or acquired from the outside, of which no mention will be made here. After the image upload has ended, the upload process ends.

<Detailed Operation of Management Apparatus 102>

Figure 9:
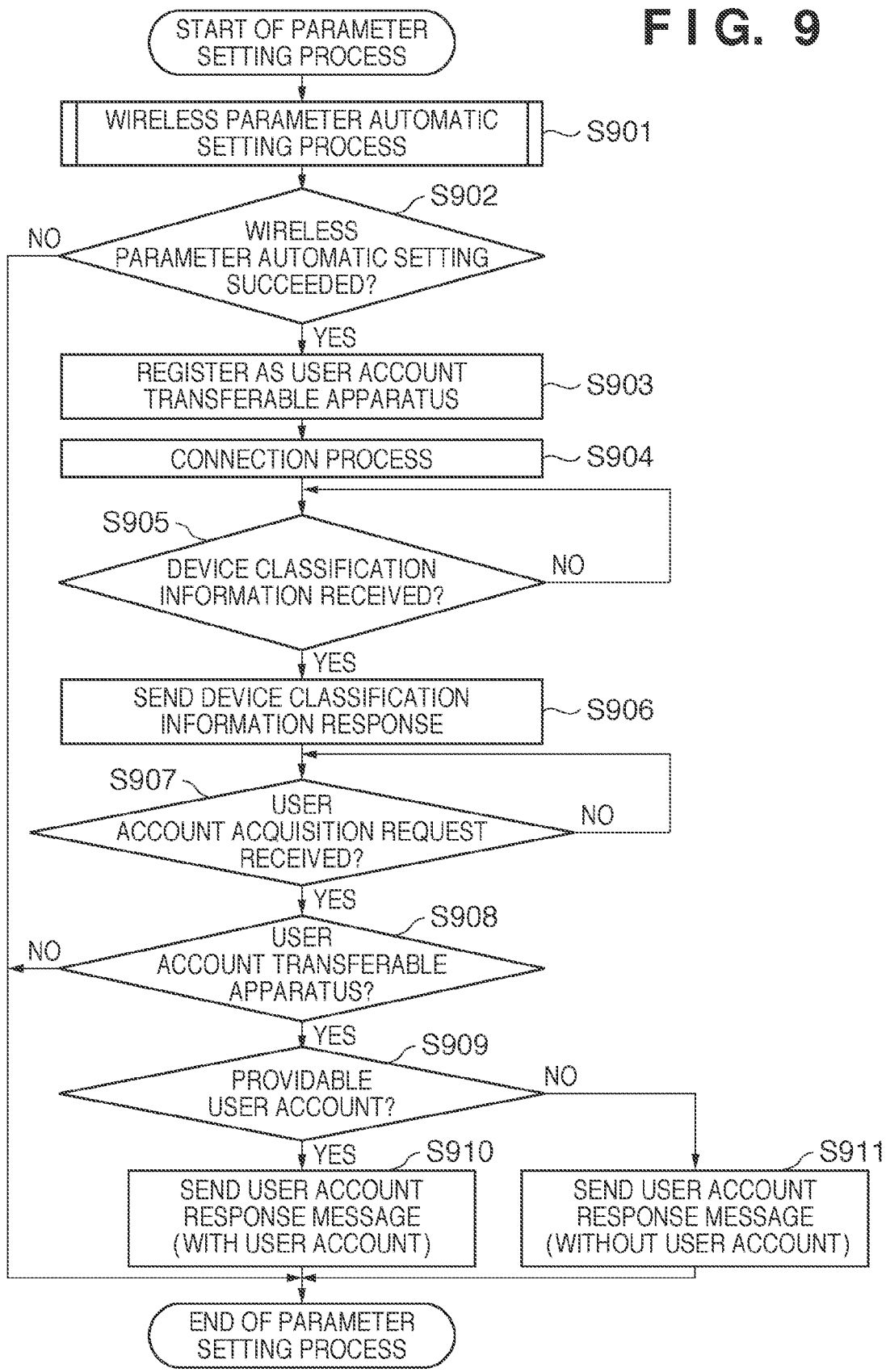
FIG. 9 is a flowchart illustrating the user account acquisition process of the management apparatus.

FIG. 9 is a flowchart of the user account acquisition process of the management apparatus 102. The steps to be explained below are implemented by causing the control unit 303 in the management apparatus 102 to execute a computer program stored in the ROM 305.

In step S901, upon receiving a wireless parameter setting process start instruction, the management apparatus 102 performs the wireless parameter automatic setting process. The parameter setting process start instruction can be input by, for example, pressing the start button of the operation unit 311 or using a program. The wireless parameter automatic setting process is performed by the parameter automatic setting processing unit 301.

After the wireless parameter automatic setting process has ended in step S901, the management apparatus determines in step S902 whether the wireless parameter setting has succeeded. If the setting has failed, the parameter setting process ends. If the setting has succeeded, the process advances to step S903.

In step S903, the management apparatus registers the partner communication apparatus which has succeeded in the wireless parameter setting process as a user account transferable apparatus. The registration can be done using the identifier (for example, a MAC address (Media Access Control address)) of the partner communication apparatus or information (for example, password) sharable by the partner communication apparatus. However, the present invention is not limited to those. After the registration, the process advances to step S904.

In step S904, a wireless LAN connection process is performed using the parameter acquired by the wireless parameter automatic setting process. The wireless LAN connection process is done via the wireless communication processing unit 302.

When the connection process has ended, the management apparatus waits for reception of a device classification information message from the partner apparatus in step S905.

Upon receiving the device classification information message, the management apparatus sends a device classification information message in step S906. In the first embodiment, a device classification information message including device classification information representing that the management apparatus 102 is a cellular phone apparatus is sent. After the sending, the process advances to step S907. Note that the order of providing the device classification information of the self apparatus and acquiring the device classification information of the partner apparatus may be reversed.

In step S907, the management apparatus waits for reception of a user account acquisition request message. Upon receiving a user account acquisition request message, the process advances to step S908.

In step S908, the management apparatus determines whether the user account acquisition request message sending source apparatus is registered as a user account transferable apparatus. For example, when a password is used, the management apparatus can determine whether the password is contained in the user account acquisition request message or whether the password is authentic. Upon determining that the apparatus is registered as a user account transferable apparatus, the process advances to step S909. Upon determining that the apparatus is not registered, the parameter setting process ends.

In step S909, the management apparatus determines whether there is a user account that may be provided to the user account acquisition request message sending source apparatus. In the first embodiment, the device classification of the wireless communication apparatus 101 can be determined as a "camera" by the device classification information message. A service type corresponding to the device classification information is extracted using the comparison table of device classification information and service types shown in FIG. 5. For example, if the device classification is "camera", a user account corresponding to service type "Image-Share" is extracted.

More specifically, "account A" and "account B" are extracted from the user account list 401 in the management apparatus 102. The extracted user accounts are decided as user accounts to be transferred. When transferring the user accounts, pieces of supplementary information (information described in the user account list) are transferred together with the user accounts. Note that if the device classification information of the wireless communication apparatus 101 is "video camera", "account C" corresponding to the service type 403 "Movie-Share" is transferred. That is, if a user account exists, the process advances to step S910. If no user account exists, the process advances to step S911.

In step S910, the user account processing unit 314 adds a user account to a user account acquisition response message, and sends it to the user account acquisition request message sending source apparatus. On the other hand, in step S911, the user account processing unit 314 sends, to the user account acquisition request message sending source apparatus, a user account acquisition response message indicating that no user account exists or may be provided.

<User Account Registration Process>

A process to be executed when the wireless communication apparatus determines in step S802 of FIG. 8 that a user account is unregistered, and sends a user account registration request message will be described below. This is a case in which the wireless communication apparatus 101 will use, out of the user accounts acquired from the management apparatus 102, an unregistered user account for authentication of a web service.

Figure 10:
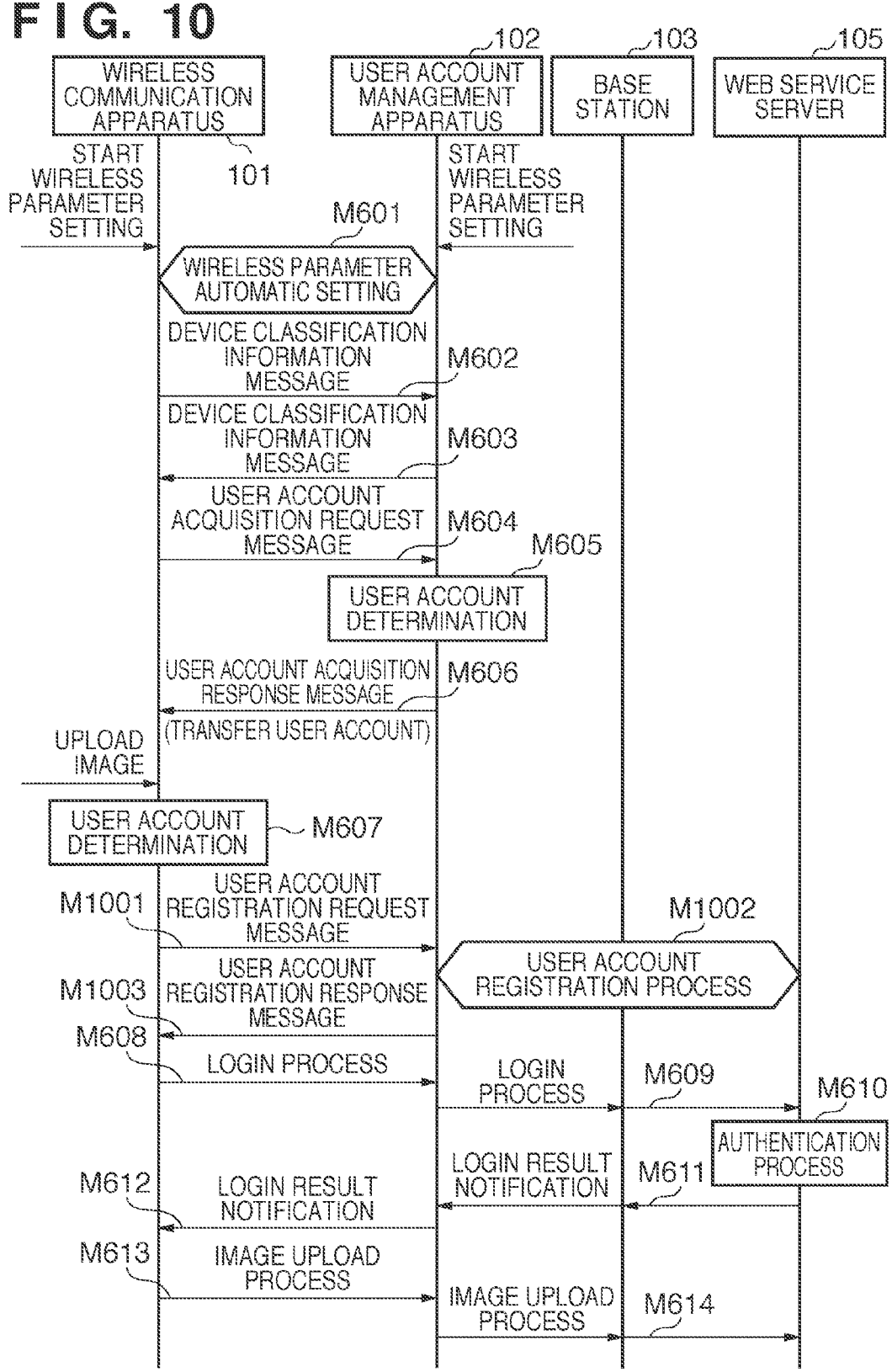
FIG. 10 is a sequence chart showing the operation of the communication system according to the first embodiment (when a user account is not registered)

FIG. 10 is a sequence chart showing the user account registration process. The base sequence is the same as in FIG. 6, and a description thereof will not be repeated.

Upon determining by the user account determination that user account registration is necessary in M607, the wireless communication apparatus 101 sends a user account registration request message to the management apparatus 102 in M1001. The user account registration request message is sent with a designation of the registration target user account.

The management apparatus 102 receives the user account registration request message. Upon determining to perform the user account registration process, the process of registering the user account designated by the wireless communication apparatus 101 is performed in M1002 between the management apparatus 102 and the web service server 105 via the base station 103.

The user account is registered in the web service server 105. After the user account registration process has ended, the management apparatus 102 sends a user account registration response message to the wireless communication apparatus 101 as the result of the registration process in M1003. If the user account registration has succeeded, the login process is performed using the registered user account as in FIG. 6. Subsequently, the image upload process is executed.

Figure 11:
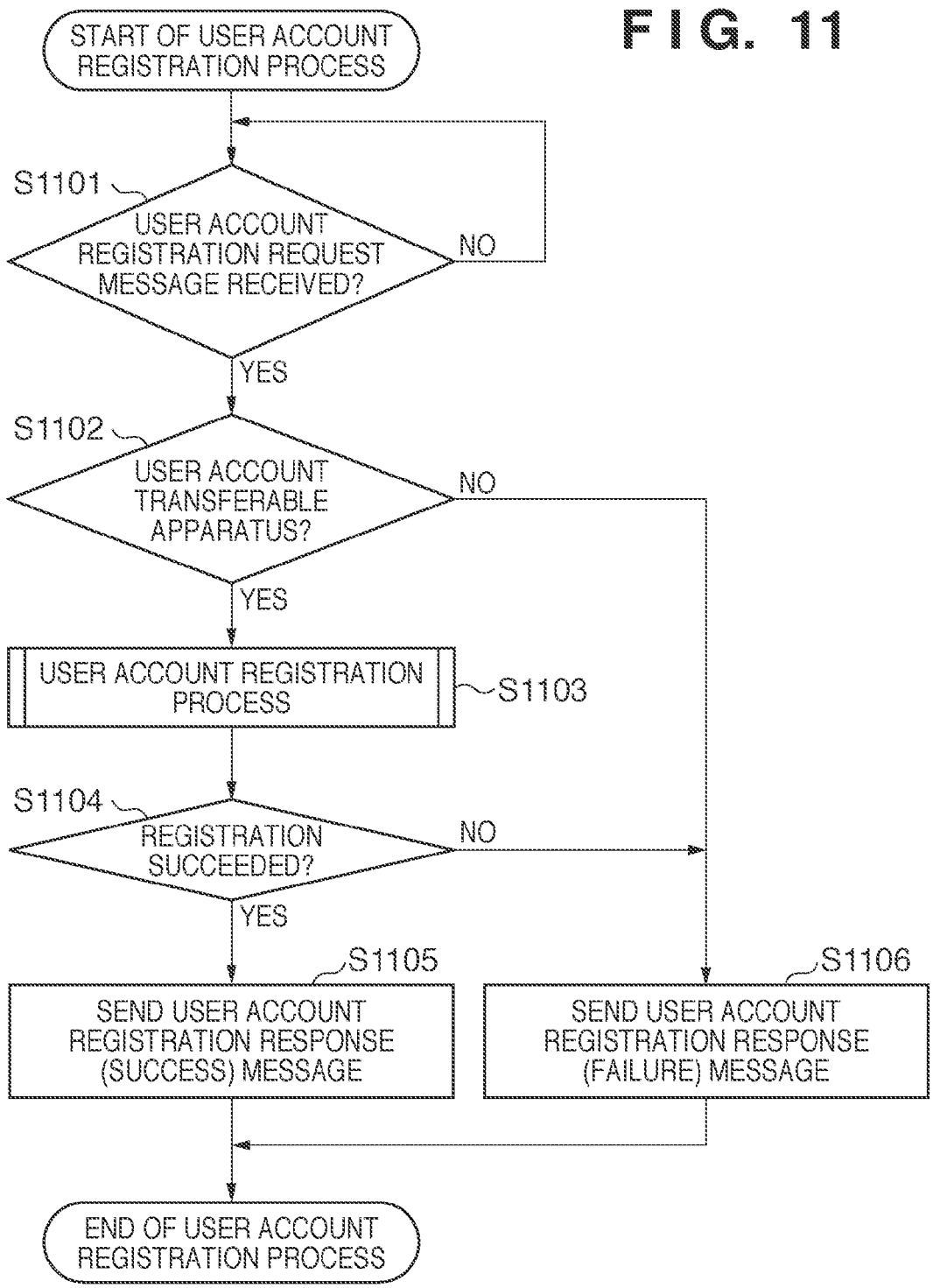
FIG. 11 is a flowchart illustrating the user account registration process of the management apparatus.

FIG. 11 is a flowchart illustrating the user account registration process of the management apparatus 102. Note that the steps to be explained below are implemented by causing the control unit 303 in the management apparatus 102 to execute a computer program stored in the ROM 305.

In step S1101, the management apparatus 102 waits for reception of a user account registration request message. In step S1102, the management apparatus determines whether the sending source apparatus is registered as a user account transferable apparatus. Upon determining that the apparatus is registered, the process advances to step S1103. Upon determining that the apparatus is not registered, the process advances to step S1106.

In step S1103, the user account registration process is performed. The user account is registered by, for example, a program. Alternatively, a user account registration notification may be displayed on the display unit 310 to make the user perform the registration process. The present invention is not limited to these methods as far as the user account registration process can be executed. The registration process program can be either stored in the ROM 305 or independently installed from the outside to the management apparatus 102. After the end of the user account registration process, the process advances to step S1104.

In step S1104, the user account processing unit 314 determines whether the user account registration has succeeded. If the registration has succeeded, the process advances to step S1105. If the registration has failed, the process advances to step S1106.

In step S1105, the management apparatus sends a user account registration response message including information representing that the user account registration has succeeded to the user account registration request message sending source apparatus. After the sending, the user account registration process ends. On the other hand, in step S1106 (when the account is determined as being not registered in either step S1102 or step S1104), the management apparatus sends a user account registration response message including information representing that the user account registration has failed to the user account registration request message sending source apparatus. After the sending, the user account registration process ends.

<User Account Creation Process>

A process to be executed when a user account creation request message is sent in step S807 of FIG. 8 will be described below. This is a case in which the wireless communication apparatus 101 has determined in step S801 that it does not have the user account of the upload destination, and in step S806 that an apparatus capable of creating a user account exists in the network.

Figure 12:
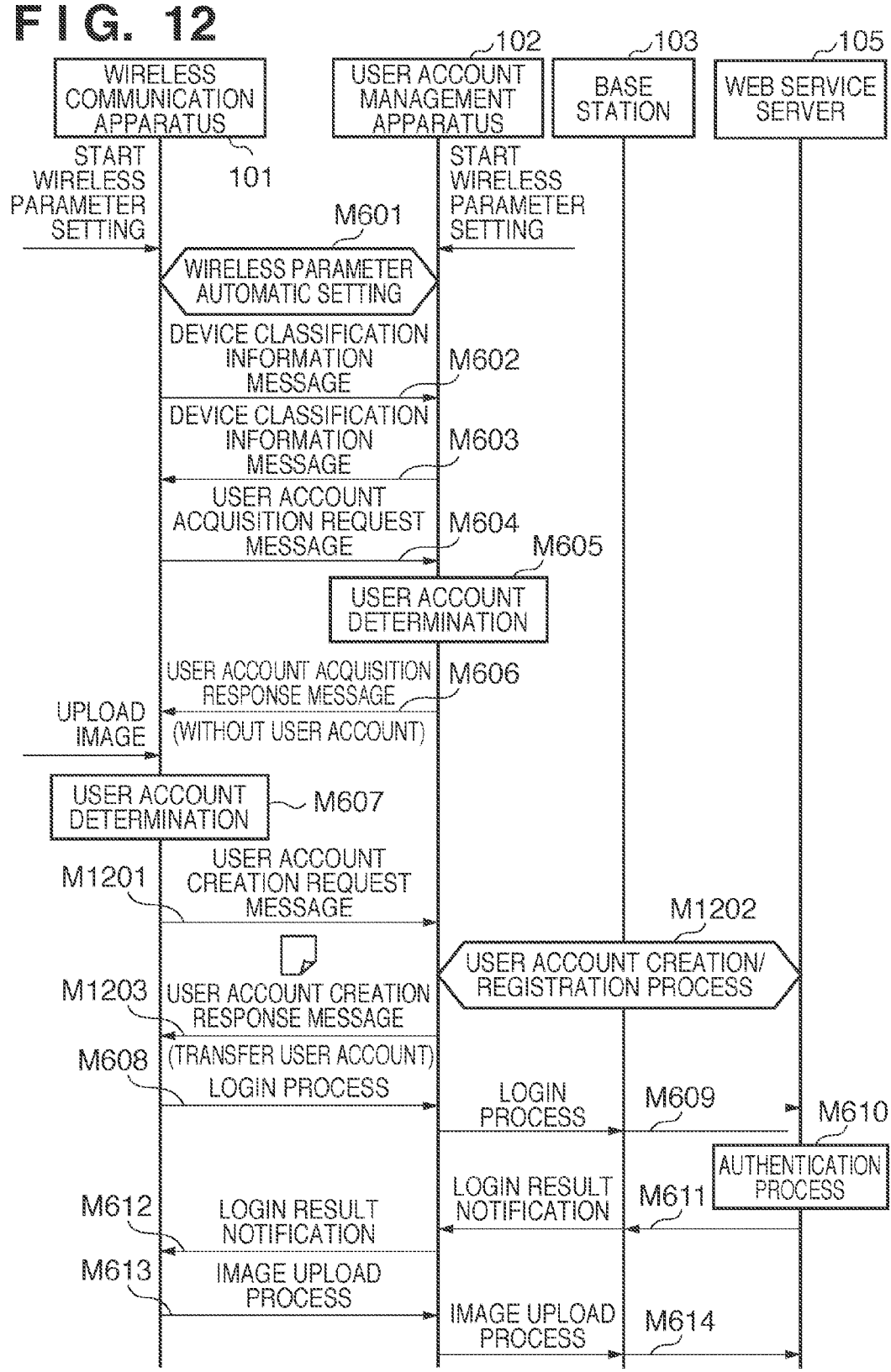
FIG. 12 is a sequence chart showing the operation of the communication system according to the first embodiment (when a user account is not yet created)

FIG. 12 is a sequence chart showing the user account creation process. The base sequence is the same as in FIG. 6, and a description thereof will not be repeated.

Upon determining by the user account determination M607 that user account creation is necessary, the wireless communication apparatus 101 sends a user account creation request message to the management apparatus 102 in M1201.

The management apparatus 102 receives the user account creation request message. Upon determining to perform the user account creation process, the user account creation process is performed in M1202 between the management apparatus 102 and the WEB service server 105 via the base station 103.

After the user account creation process has ended, the management apparatus 102 sends a user account creation response message to the wireless communication apparatus 101 as the result of the creation process in M1203. If the user account creation has succeeded, the login process is performed using the created user account. Subsequently, the image upload process is executed.

Figure 13:
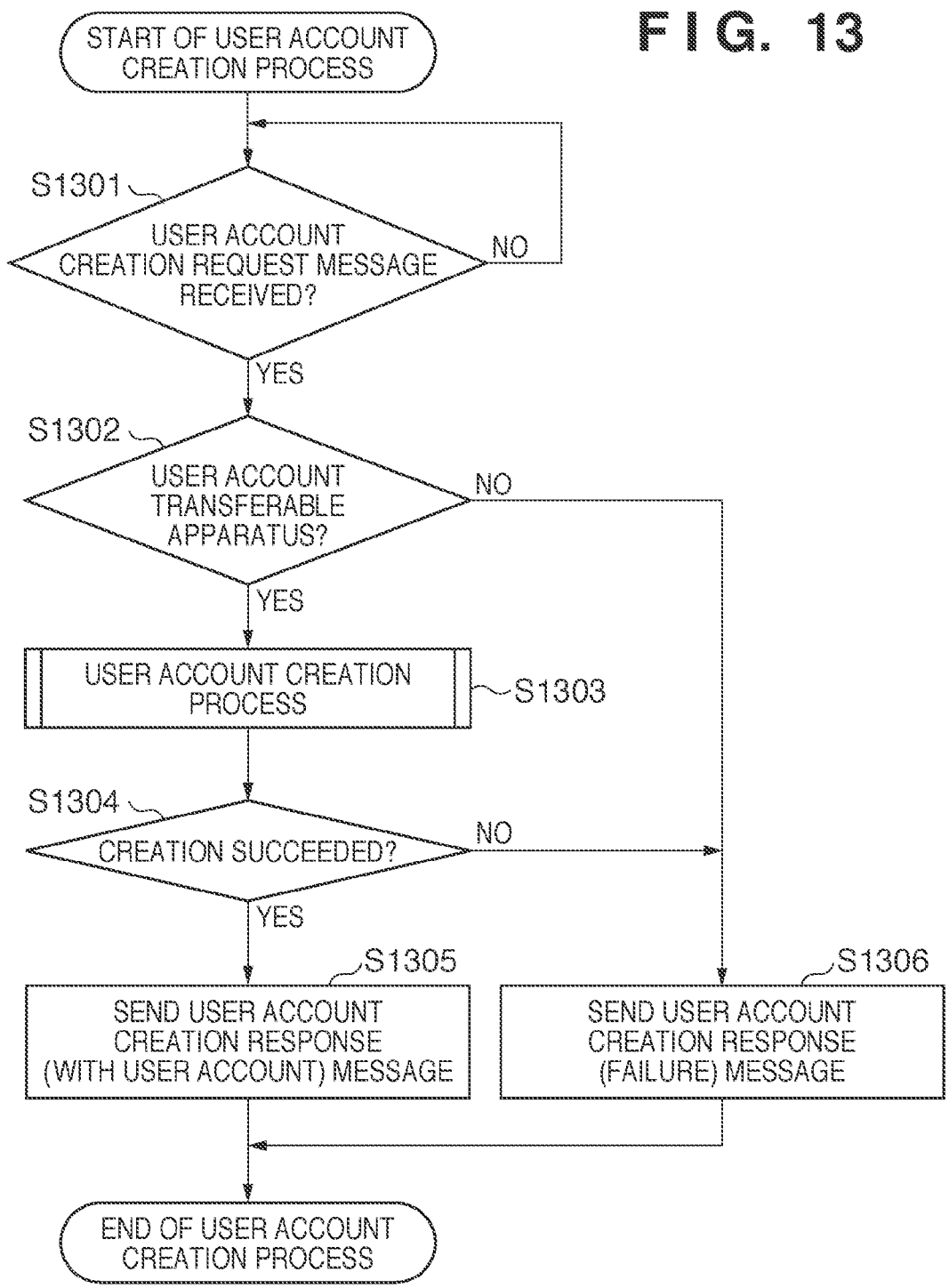
FIG. 13 is a flowchart illustrating the user account creation process of the management apparatus.

FIG. 13 is a flowchart illustrating the user account creation process of the management apparatus 102. Note that the steps to be explained below are implemented by causing the control unit 303 in the management apparatus 102 to execute a computer program stored in the ROM 305.

In step S1301, the management apparatus 102 waits for reception of a user account creation request message. In step S1302, the management apparatus determines whether the sending source apparatus is registered as a user account transferable apparatus. Upon determining that the apparatus is registered, the process advances to step S1303. Upon determining that the apparatus is not registered, the process advances to step S1306.

In step S1303, the user account creation process is performed. A user account is automatically created by a program. For example, if the web server designates a mail address as the user ID (identification) of a user account, it is determined whether the management apparatus has a mail address. If the management apparatus has a mail address, the mail address and an arbitrary password are created, and a user account is created using them. A user account may be created based on predetermined information held by the wireless communication apparatus 101. The predetermined information for user account creation is stored in the ROM 204 of the wireless communication apparatus 101, and a user account creation request message including the information is sent to the management apparatus 102. Examples of the predetermined information are a mail address of the device name of the wireless communication apparatus 101. However, the present invention is not limited to those.

Alternatively, a user account may be created based on information used in the wireless parameter automatic setting process. For example, if authentication information such as a PIN code is used in the wireless parameter automatic setting process, the PIN code is used as the user ID or password. Note that arbitrary information shared by the wireless communication apparatus 101 and the management apparatus 102 in the wireless parameter automatic setting process is usable.

Instead of automatically creating a user account, a user account creation notification may be displayed on the display unit 310 to make the user perform the creation process. For example, it is determined whether an image authentication code is used in user account creation. If an image authentication code is used, the user is caused to perform the creation process. The creation process program can be either stored in the ROM 305 or interpedently installed from the outside to the management apparatus 102. After the end of the user account creation process, the process advances to step S1304.

In step S1304, the user account processing unit 314 determines whether the user account creation has succeeded. If the creation has succeeded, the process advances to step S1305. If the creation has failed, the process advances to step S1306.

In step S1305, the management apparatus sends a user account creation response message including information representing that the user account creation has succeeded to the user account creation request message sending source apparatus. On the other hand, in step S1306, the management apparatus sends a user account creation response message including information representing that the user account creation has failed to the user account creation request message sending source apparatus.

As described above, according to the communication system of the first embodiment, the management apparatus capable of creating a user account transfers a user account to another wireless communication apparatus. The other wireless communication apparatus need not set a new user account, and thus improves the user convenience. That is, it is possible to provide a technique of allowing the wireless communication apparatus 101 that has difficulties in creating and setting user account information by itself to easily set the user account information. It is also possible to provide a user account suitable for the wireless communication apparatus of the providing destination.

Note that in the above-described first embodiment, the user account setting process is executed separately from the wireless parameter automatic setting process. However, the wireless parameter automatic setting process may include the user account setting process. In the above-described first embodiment, the communication system includes one wireless communication apparatus and one management apparatus, for the descriptive convenience. However, the above-described operation is executable even for a system including a plurality of wireless communication apparatuses and management apparatuses. A priority order may be set for the plurality of management apparatuses so as to make the wireless communication apparatus to selectively adopt user accounts sent from the plurality of management apparatuses.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-186778, filed on Aug. 11, 2009, which is hereby incorporated by reference herein in its entirety.

What is claimed is:

1. A management apparatus which manages account information relating to a service provided by a server apparatus, comprising:
   a storage unit configured to store a plurality of account information;
   a setting unit configured to perform a setting process, by which a wireless parameter used in a communication between a user apparatus and the management apparatus is set, between the user apparatus and the management apparatus;
   an acquisition unit configured to acquire, when the setting unit performs the setting process, device type information of the user apparatus from the user apparatus; and
   a providing unit configured to provide, from among the plurality of account information stored in said storage unit, account information corresponding to the device type information of the user apparatus acquired by the acquisition unit,
   wherein the account information comprises information for identifying the service provided by the server apparatus, user ID information and password information for logging in to the server apparatus.

2. The management apparatus according to claim 1, further comprising a registration unit configured to instruct the server apparatus to register account information designated by the user apparatus.

3. The management apparatus according to claim 1, further comprising a creation unit configured to create account information in accordance with an instruction from the user apparatus.

4. The management apparatus according to claim 1, wherein said providing unit is configured to provide the account information corresponding to the device type information of the user apparatus to the user apparatus in a case where an account information acquisition request is received from the user apparatus.

5. The management apparatus according to claim 1, wherein the device type information is information which can distinguish whether the user apparatus is a camera or a video camera.

6. The management apparatus according to claim 1, wherein the service provided by the server apparatus is a service for sharing image data.

7. The management apparatus according to claim 1, wherein the providing unit provides the same account information to a first user apparatus and a second user apparatus in a case where the acquisition unit acquires the same device type information from the first user apparatus and the second user apparatus.

8. The management apparatus according to claim 1, wherein the account information is information used to authenticate the user apparatus at the server apparatus.

9. The management apparatus according to claim 1 further comprising a selecting unit configured to select, from among the plurality of account information stored in the storage unit, the account information corresponding to the device type information of the user apparatus acquired by the acquisition unit,
   wherein the providing unit provides the account information selected by the selecting unit to the user apparatus.

10. A method of controlling a management apparatus which manages account information related to a service provided by a server apparatus, the method comprising the steps of:
    storing in a storage unit a plurality of account information;
    performing a setting process, by which a wireless parameter used in a communication between a user apparatus and the communication apparatus is set, between the user apparatus and the management apparatus;
    acquiring, when the setting process is performed, device type information of the user apparatus from the user apparatus; and
    providing, from among the plurality of account information stored in the storage unit, account information corresponding to the device type information of the user apparatus acquiring in the acquiring step to the user apparatus,
    wherein the account information comprises information for identifying the service provided by the server apparatus, user ID information and password information for logging in to the server apparatus.

11. A non-transitory computer-readable storage medium storing code of a computer program that, when executed by a computer, causes the computer to execute a method of controlling a management apparatus which manages account information related to a service provided by a server apparatus, the program comprising:
    code for storing in a storage unit a plurality of account information;
    code for performing a setting process, by which a wireless parameter used in a communication between a user apparatus and the management apparatus is set, between the user apparatus and the management apparatus;
    code for acquiring, when the setting process is performed, device type information of the user apparatus from the user apparatus; and
    code for providing, from among the plurality of account information stored in the storage unit, account information corresponding to the device type information of the user apparatus acquiring in the acquiring step to the user apparatus,
    wherein the account information comprises information for identifying the service provided by the server apparatus, user ID information and password information for logging in to the server apparatus.

* * * * *